(12) United States Patent
Sakamoto et al.

(10) Patent No.: US 7,060,373 B2
(45) Date of Patent: Jun. 13, 2006

(54) MAGNETO-OPTICAL RECORDING MEDIUM AND SIGNAL REPRODUCTION METHOD

(75) Inventors: Tetsuhiro Sakamoto, Tokyo (JP); Kazutomo Miyata, Miyagi (JP); Teruyuki Ota, Miyagi (JP); Makoto Watanabe, Miyagi (JP); Yasuhito Tanaka, Tokyo (JP); Goro Fujita, Kanagawa (JP); Takeshi Miki, Tokyo (JP); Kazuhiko Fujiie, Kanagawa (JP)

(73) Assignee: Sony Corporation, Tokyo (JP)

( * ) Notice: Subject to any disclaimer, the term of this patent is extended or adjusted under 35 U.S.C. 154(b) by 246 days.

(21) Appl. No.: 10/765,601

(22) Filed: Jan. 27, 2004

(65) Prior Publication Data

US 2004/0244027 A1 Dec. 2, 2004

(30) Foreign Application Priority Data

Jan. 30, 2003 (JP) ............................. 2003-022643

(51) Int. Cl.
*G11B 11/105* (2006.01)

(52) U.S. Cl. ................ 428/819.3; 428/820.5; 428/820.6; 369/13.46; 369/13.47

(58) Field of Classification Search ............. 428/819.3; 369/13.46, 13.47

See application file for complete search history.

(56) References Cited

U.S. PATENT DOCUMENTS

| | | | | |
|---|---|---|---|---|
| 6,197,440 B1 * | 3/2001 | Shiratori | ................... | 428/819.3 |
| 6,572,957 B1 * | 6/2003 | Aratani | ....................... | 428/212 |
| 6,707,766 B1 * | 3/2004 | Mori et al. | ............... | 369/13.08 |
| 6,770,387 B1 * | 8/2004 | Tanaka et al. | ............ | 428/819.3 |
| 6,894,954 B1 * | 5/2005 | Aoki | ........................ | 369/13.44 |
| 6,949,302 B1 * | 9/2005 | Iwata et al. | .............. | 369/13.44 |

* cited by examiner

*Primary Examiner*—Kevin M. Bernatz
(74) *Attorney, Agent, or Firm*—Robert J. Depke; Trexler, Bushnell, Giangiorgi, Blackstone & Marr, Ltd.

(57) ABSTRACT

A magneto-optical recording medium includes a first magnetic layer (reproduction layer), a second magnetic layer (control layer), a third magnetic layer (blocking layer), and a fourth magnetic layer (recording layer) having respective Curie temperatures $T_{C1}$, $T_{C2}$, $T_{C3}$ and $T_{C4}$. The Curie temperatures of the layers satisfy the relationships $T_{C1} > T_{C3} > T_{C2}$ and $T_{C4} > T_{C3}$. In addition, the magnetic anisotropy of the third magnetic layer $K_{u3}$ is greater than that of the second magnetic layer $K_{u2}$. A magnetic domain wall in the first magnetic layer in front of the spot irradiated by the reproduction light in the direction of travel is displaced toward the peak temperature portion so that a recorded domain is expanded. Displacement in the spot direction of a domain wall in the first magnetic layer behind the reproduction light spot in the direction of travel is suppressed. The second and third magnetic layers control the magnetic exchange coupling between the first and fourth magnetic layers.

2 Claims, 14 Drawing Sheets

MAGNETO-OPTICAL RECORDING MEDIUM AND SIGNAL REPRODUCTION METHOD

The present application claims priority to Japanese Patent Application JP2003-022643, filed in the Japanese Patent Office Jan. 30, 2003; the entire contents of which are incorporated herein by reference.

BACKGROUND OF THE INVENTION

1. Field of the Invention

This invention relates to a magneto-optical recording medium, and in particular to a magneto-optical recording medium from which signals are reproduced by domain wall displacement detection (DWDD).

2. Description of the Related Art

Due to the transition to digital information of recent years, it has become possible to record large quantities of digital data, and there has arisen strong market demand for recording media with inexpensive unit cost.

As optical recording media technology enabling large capacities, a magneto-optical recording medium employing domain wall displacement detection (DWDD) for reproduction of magneto-optical recording signals has such features as a resolution which is not in principle limited by the limiting optical resolution of the reproduction light, determined by the optical system wavelength and the numerical aperture (NA) of the objective lens; the ability to obtain large reproduction signals from minute recorded domains; and the ability to achieve extremely high linear recording densities.

In the basic configuration of this DWDD medium, the magnetic layer has a three-layer structure comprising, from the side of incidence of reproduction light, a magnetic layer constituting a reproduction layer, a magnetic layer constituting a blocking layer or a so-called switching layer, and a magnetic layer constituting a recording layer. At room temperature, these magnetic layers are in a state in which the recording layer and reproduction layer are magnetically exchange-coupled through the blocking layer, and recorded domains in the recording layer are transferred to the reproduction layer; by causing the magnetic properties of the blocking layer to disappear through a rise in temperature caused by irradiation of reproduction light, the magnetic coupling between the reproduction layer and recording layer is blocked, and this higher temperature distribution causes an expansion of recorded domains in the reproduction layer within the spot of reproduction light. Consequently excellent reproduction characteristics can be obtained even from minute recorded domains, that is, at higher recording densities.

However, for reasons that are explained in detail below, there is the problem that due to the principle of detection employed in this DWDD medium, ghost signals occur in addition to the main signals.

In response to this there has been a proposal of a magneto-optical recording medium and a signal reproduction method to suppress the occurrence of ghost signals (International Patent Publication No. WO99/39342, from the 10th line of page 5 to the 6th line of page 13, FIGS. 1 to 18).

This magneto-optical recording medium adopts a four-layer structure which adds a control layer (a layer to suppress domain wall displacement) between the reproduction layer (displacement layer) and the blocking layer (switching layer) of the above-described magnetic layer with a three-layer structure.

In this case, the blocking layer and control layer have the respective Curie temperatures $T_{C2}$ and $T_{C3}$, wherein $T_{C2} > T_{C3}$.

In this medium, the control layer (suppression layer) suppresses displacement of domain walls from behind the reproduction light spot, which is the origin of the occurrence of ghost signals, so as to suppress the occurrence of ghost signals.

According to the invention disclosed in the above-described International Patent, although the occurrence of ghost signals is alleviated, domain wall displacement is suppressed, so that there is the possibility of a decline in reproduction output, that is, of the occurrence of dropout; reproduction is particularly easily affected in land and groove recording at high linear densities. Hence in order to improve recording and reproduction characteristics using the invention disclosed in the above International Patent, ghost signals must be effectively suppressed at a desired linear density, and moreover the configuration of the magnetic layer must be designed carefully such that dropout does not occur.

The present invention was arrived at through the discovery of a magneto-optical recording medium with simplified magnetic layer design and a signal reproduction method, which avoid the occurrence of ghost signals and enable improvement of dropout.

SUMMARY OF THE INVENTION

A magneto-optical recording medium of this invention is optical recording medium in which signal reproduction by the irradiation of reproduction light is performed by means of domain wall displacement detection (DWDD).

In this invention, the magneto-optical recording medium is configured having at least, in order from the side of incidence of laser light for reproduction, a first magnetic layer constituting a reproduction layer, a second magnetic layer constituting a control layer, a third magnetic layer constituting a blocking layer, and a fourth magnetic layer constituting a recording layer, wherein, when the respective Curie temperatures of the first magnetic layer, second magnetic layer, third magnetic layer and fourth magnetic layer are $T_{C1}$, $T_{C2}$, $T_{C3}$ and $T_{C4}$, the relations $T_{C1} > T_{C3} > T_{C2}$ and $T_{C4} > T_{C3}$ are satisfied.

At the same time, when the magnetic anisotropy of the second magnetic layer is $K_{u2}$ and the magnetic anisotropy of the third magnetic layer is $K_{u3}$, the relation $K_{u3} > K_{u2}$ is satisfied.

This configuration is such that domain walls in the first magnetic layer are displaced toward the peak portion of the increased-temperature portion occurring in the vicinity of the center of the reproduction light spot due to irradiation by reproduction light, in front of the spot of irradiated reproduction light in the direction of travel of the optical recording medium, so that recorded domains are expanded; in addition, behind the reproduction light spot in the direction of travel, displacement in the spot direction of domain walls in the first magnetic layer is suppressed, and the second magnetic layer and third magnetic layer control the magnetic exchange coupling of the first magnetic layer with the fourth magnetic layer.

Further, a signal reproduction method of this invention detects reproduction signals in a magneto-optical recording medium by means of domain wall displacement detection due to irradiation of reproduction light.

In this signal reproduction method, the magneto-optical recording medium has at least, in order from the side of incidence of laser light for reproduction, a first magnetic layer constituting a reproduction layer, a second magnetic layer constituting a control layer, a third magnetic layer constituting a blocking layer, and a fourth magnetic layer constituting a recording layer, wherein, when the respective Curie temperatures of the first magnetic layer, second magnetic layer, third magnetic layer and fourth magnetic layer are $T_{C1}$, $T_{C2}$, $T_{C3}$ and $T_{C4}$, the relations $$T_{C1} > T_{C3} > T_{C2} \text{ and}$$

$$T_{C4} > T_{C3}$$

are satisfied, and at the same time, when the magnetic anisotropy of the second magnetic layer is $K_{u2}$ and the magnetic anisotropy of the third magnetic layer is $K_{u3}$, the relation $$K_{u3} > K_{u2}$$

is satisfied.

The signal reproduction method uses a magneto-optical recording medium configured such that domain walls in the first magnetic layer are displaced toward the peak portion of the increased-temperature portion occurring in the vicinity of the center of the reproduction light spot due to irradiation by reproduction light, in front of the spot of irradiated reproduction light in the direction of travel of the optical recording medium, so that recorded domains are expanded, and in addition, behind the reproduction light spot in the direction of travel, displacement in the spot direction of domain walls in the first magnetic layer is suppressed; and the second magnetic layer and third magnetic layer control the magnetic exchange coupling of the first magnetic layer with the fourth magnetic layer.

As explained above, the magneto-optical recording medium of this invention, or a magneto-optical recording medium specified for use with a signal reproduction method of this invention, has a magnetic layer configured with a four-layer structure in which a control layer (second magnetic layer) and blocking layer (third magnetic layer) intervene between the reproduction layer (first magnetic layer) and recording layer (fourth magnetic layer), and the relations between the Curie temperatures and magnetic anisotropies of each of the magnetic layers are such that, between the second magnetic layer and third magnetic layer in particular, $T_{C3} > T_{C2}$ and $K_{u3} > K_{u2}$ as described above; by this means, the occurrence of ghost signals is suppressed, and there is improvement of dropout and hence of the error rate.

DESCRIPTION OF THE PREFERRED EMBODIMENTS

Embodiments of a magneto-optical recording medium and a signal reproduction method of this invention are illustrated.

First, a magneto-optical recording medium of this invention, and embodiments thereof, are explained.

[Embodiments of Magneto-Optical Recording Medium]

Figures 1A, 1B:
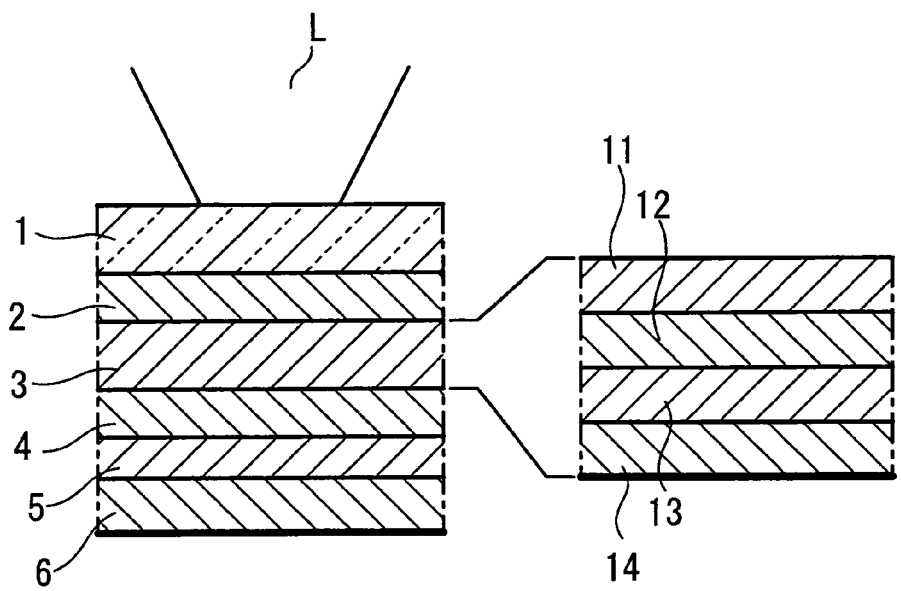
FIG. 1A is a schematic cross-sectional view of an example of a magneto-optical recording medium of this invention.
FIG. 1B is a schematic cross-sectional view of the recording and reproduction layers in FIG. 1A.

A magneto-optical recording medium of this invention is fabricated by forming, laminated in order on a substrate 1, and in this example on a transparent substrate 1, a dielectric film 2, a recording and reproduction film 3, a dielectric film 4, a reflective film 5, and a protective film 6, as shown for example in the schematic cross-sectional view of FIG. 1A.

The dielectric films 2, 4 are formed, for example, from silicon nitride. Of the dielectric films 2, 4 can comprise silicon oxide, aluminum nitride, or another dielectric material.

The reflective film 5 is formed of aluminum or other materials; however the reflective film 5 can be omitted.

The protective film 6 comprises, for example, an ultraviolet-curing resin.

Irradiation of this magneto-optical recording medium with light for recording and reproduction assumes irradiation from the side of the transparent substrate 1; but a configuration is also possible in which irradiation is from the opposite side, which is the side of the protective film 6. In this case, the position of formation of the reflective film 5 is placed between the dielectric film 2 and the transparent substrate 1, and the laminating arrangement of each of the layers comprised by the recording and reproduction layer 3, explained below, is the opposite arrangement.

As the film thicknesses of the constituent films of the above-described optical recording medium, for example, the thickness of the dielectric film 1 can be made 700 Å, the thickness of the dielectric film 4 can be 500 Å, and the thickness of the reflective film 5 can be 300 Å.

On the other hand, the recording and reproduction layer 3 in a magneto-optical recording medium employing the usual DWDD method essentially comprises three layers, which are a reproduction layer or so-called displacement designed such that domain wall displacement occurs, a blocking layer or so-called switching layer, and a recording layer or so-called memory layer.

On the other hand, in a magneto-optical recording medium employing the DWDD method of this invention, the recording and reproduction layer is configured with a four-layer structure in which a magnetic layer comprising a control layer to control displacement of magnetic domains in the reproduction layer is further provided between the above-described reproduction layer and blocking layer.

That is, the recording and reproduction layer 3 shown in FIG. 1A has a four-layer structure, as shown enlarged in FIG. 1B, comprising, from the side of incidence of reproduction light L on the magneto-optical recording medium, or in this example, from the side of the substrate 1, a first magnetic layer 11 comprising the reproduction layer; a second magnetic layer 12 comprising the above-described control layer; a third magnetic layer 13 comprising the blocking layer; and a fourth magnetic layer 14 comprising the recording layer.

Each of these magnetic layers has characteristics required of the layer.

Because of the need to obtain an adequate reproudction signal at elevated temperatures resulting from irradiation with reproduction light during reproduction, the reproduction layer (first magnetic layer) 11 must have a high Curie temperature $T_{C1}$ at such temperatures, and must have a large Kerr rotation angle. Specifically, the Curie temperature $T_{C1}$ must at least be higher than the Curie temperature $T_{C3}$ of the blocking layer (third magnetic layer) 13.

Also, it is required that magnetic domains in the reproduction layer 11 be easily displaced when the exchange coupling with the blocking layer 13 is interrupted during reproduction. Consequently the magnetic domain wall coercive force (coercivity) must be small, and it is preferable that this magnetic domain wall coercive force be 1 kOe or lower.

The thickness of the reproduction layer 11 need only be equal to or greater than the film thickness necessary for saturation of the Kerr rotation angle, and can be made 200 Å or greater, or more desirably 250 Å or greater.

As the constituent material of the reproduction layer 11, for example GdFe or GdFeCo may be used, and Al, Cr or similar may be added to control the Curie temperature and the magnetic anisotropy.

The reproduction layer 11 can be formed to comprise three or more layers, but when a film comprising two or more layers is employed, in any case it is desirable that the layer with the highest Curie temperature be positioned on the side of incidence of reproduction light.

The blocking layer 13 plays the role of blocking the exchange coupling between the reproduction layer 11 and the recording layer (fourth magnetic layer) 14 at a certain temperature, and so must have a predetermined Curie temperature $T_{C3}$ at that preset temperature.

The thickness of the blocking layer 13 need only be sufficiently great to enable stable and uniform interruption of the exchange force; it is preferable that the thickness be 50 Å or greater, and still more preferable that the thickness be 100 Å or greater. However, if the film thickness of this blocking layer 13 is too great, the effect in blocking the exchange force becomes uneven, and degradation of the reproduction signal may result. Consequently the upper limit is set at approximately 200 Å.

As the constituent material of this blocking layer, for example TbFe or TbFeCo may be used, with Al, Cr or similar added to adjust the Curie temperature and magnetic anisotropy.

The recording layer 14 is a layer which maintains recorded domains; because minute recorded domain shapes must be maintained stably during reproduction also, the Curie temperature $T_{C4}$ must be equal to or greater than the Curie temperature $T_{C3}$ of the blocking layer 13, and in addition, it is necessary that the coercivity and perpendicular magnetic anisotropy be large in order that minute recorded domains can be maintained stably.

As the constituent material of this recording layer 14, for example, TbFeCo may be used.

The magneto-optical recording medium of this invention is characterized in that a control layer 12 is inserted between the reproduction layer 11 and the blocking layer 13.

This control layer 12 has the function of suppressing the transfer of magnetic domains from the recording layer 14 to the reproduction layer 11 in the portion behind the spot irradiated by reproduction light in the direction of travel; hence it is necessary that the magnetic domain wall coercive force (magnetic anisotropy) be smaller than that of the blocking layer 13.

Further, the Curie temperature $T_{C2}$ of the control layer 12 is selected to be lower than the Curie temperature $T_{C3}$ of the blocking layer 13.

As the constituent material of this control layer 12, a material comprising Tb is desirable in consideration of the function of suppressing domain wall displacement; for example, TbFe, TbFeCo, TbFeAl, or TbFeCoAl may be used.

In other words, in the configuration of this invention, the magnetic properties of each of the above-described magnetic layers 11 to 14 comprising the recording and reproduction layer 3 are such that, with respect to the Curie temperature, if the Curie temperature of the reproduction layer 11 is $T_{C1}$, the Curie temperature of the control layer 12 is $T_{C2}$, the Curie temperature of the blocking layer 13 is $T_{C3}$, and the Curie temperature of the recording layer 14 is $T_{C4}$, then the relations $T_{C1} > T_{C3} > T_{C2}$ and $T_{C4} > T_{C3}$ are satisfied.

With respect to the magnetic anisotropy, if the magnetic anisotropy of the control layer 12 is $K_{u2}$ and the magnetic anisotropy of the blocking layer 13 is $K_{u3}$, then the relation $K_{u3} > K_{u2}$ is satisfied.

Recording of information onto a magneto-optical recording medium of this invention can be performed by an optical modulation recording method used in conventional magneto-optical recording or by a magnetic field modulation recording method or similar, recording primarily in the recording layer 14.

Next, an embodiment of a signal reproduction method of this invention is explained; the signal reproduction method of this invention is a DWDD reproduction method using the above-described magneto-optical recording medium of this invention, in order to clarify the features of this invention, an explanation is given which contrasts this signal reproduction method with conventional DWDD reproduction methods and with the above-described patent publication (International Patent No. WO99/39342).

[Embodiment of the Signal Reproduction Method]

Figure 2:
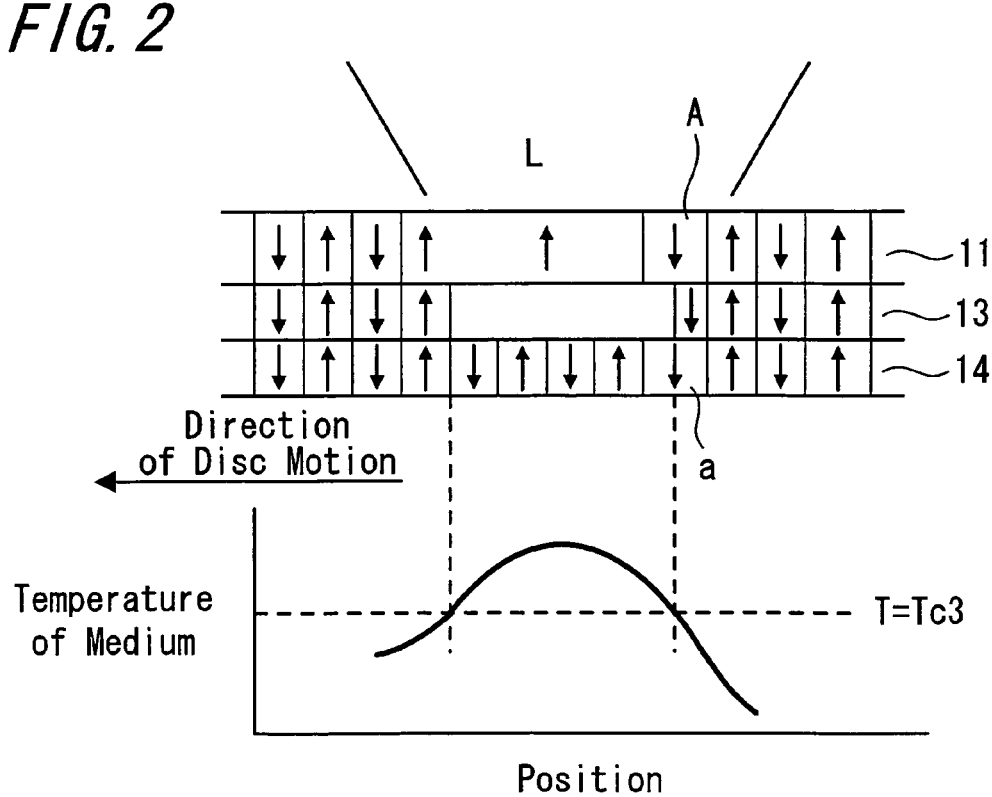
FIG. 2 is a drawing of temperature distribution, showing one magnetized state of principal portions in an explanation of the operation of the domain wall displacement detection method.

In the signal reproduction method of this invention, the reproduction layer 11, blocking layer 13, and recording layer 14 of the three-layer-structure magneto-optical recording medium which is essentially based on the DWDD method are all perpendicular magnetization films at reproduction temperatures, and the magnetization in these layers is perpendicular to the film surface, as shown in FIG. 2.

However, it is not necessary that the reproduction layer 11 and blocking layer 13 be perpendicular magnetization films at room temperature, and these layers may be in-plane magnetization films at room temperature.

In the drawings explaining magnetized states beginning with FIG. 2, the arrows in each of the magnetic layers indicate the direction of spin of the sublattice magnetization in each of the magnetic layers (for example, the direction of magnetization of Fe, Co, or similar transition metal).

Through for example the action of exchange coupling between these layers, in the normal state the spin directions are aligned.

Here, the magneto-optical recording medium is assumed to be disc-shaped, and as a result of disc rotation during reproduction the recorded domains in the medium move in the left direction in FIG. 2 relative to the reproduction light L.

As described above, recording of information on the magneto-optical recording medium is performed primarily in the recording layer 14, and recording is completed by transferring the direction of spin in the recording layer 14 to the blocking layer 13 and reproduction layer 11.

Because in the state in which reproduction light is not irradiated the recording layer 14 and reproduction layer 11 are exchange-coupled through the blocking layer 13, recorded domains a in this recording layer 14 are transferred to the reproduction layer 11 so that recorded domains A are formed in the reproduction layer 11.

During reproduction, the medium is irradiated with reproduction light L. By means of this irradiation, the temperature of each of the magnetic layers rises. Of the three-layer magnetic film, the Curie temperature $T_{C3}$ of the blocking layer 13 is set the lowest, so that as shown in FIG. 2, in portions where the increased temperature due to reproduction light irradiation exceeds the Curie temperature $T_{C3}$, the magnetization in the blocking layer 13 disappears. That is, the exchange coupling between the recording layer 14 and the reproduction layer 11 is blocked. The region in which the temperature T exceeds the Curie temperature $T_{C3}$ and the magnetization in the blocking layer 13 has disappeared is indicated by empty spaces in the drawings explaining magnetized states beginning with FIG. 2.

Because the recording layer 14 comprises magnetic material with large magnetic anisotropy and high coercivity, such as for example TbFeCo, even if the exchange coupling with other magnetic layers disappears, no change occurs in the recorded state.

Figure 3:
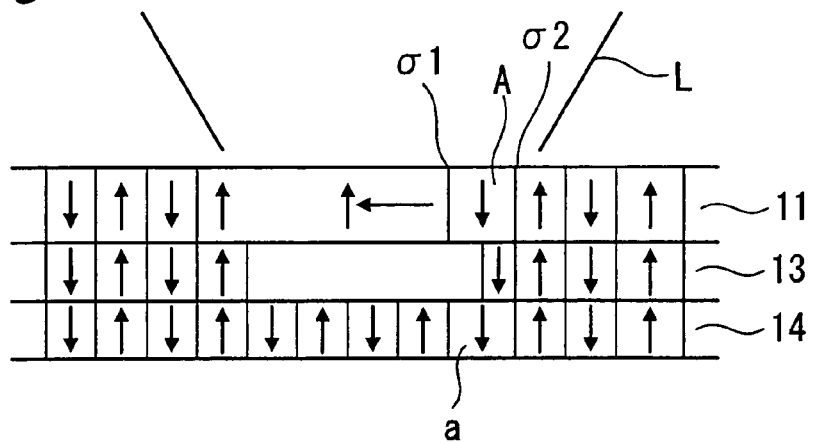
FIG. 3 shows a magnetized state of principal portions in an explanation of the operation of the domain wall displacement detection method.

On the other hand, in contrast with the recording layer 14, the reproduction layer 11 comprises a material with small magnetic anisotropy and comparatively low coercivity, and in which domain walls formed on the periphery of recorded domains are easily displaced, such as for example GdFeCo; consequently when the exchange coupling with the recording layer 14 disappears, a domain wall a, in the reproduction layer 11 at a position in front of the spot of the reproduction light L in the direction of travel is displaced in the direction resulting in lower magnetic energy, as shown in FIG. 3. Here, displacement of the domain wall σ1 toward the left in the figure results in lower energy.

Figure 4:
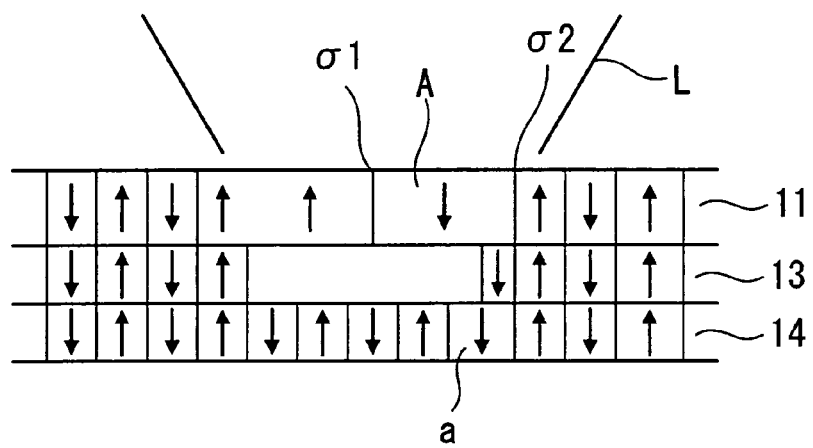
FIG. 4 shows a magnetized state of principal portions in an explanation of the operation of the domain wall displacement detection method.

FIG. 4 shows a state in which the domain wall $\sigma_1$ has been displaced. As a result of displacement of the domain wall $\sigma_1$ in the reproduction layer 11, the recorded domain A in the reproduction layer 11 corresponding to the recorded domain a in the recording layer 14 is expanded under the reproduction light, so that through the action of the reproduction light, a large reproduction carrier signal can be obtained.

The magnetic energy, which here is the magnetic wall energy $\sigma_w$, is considered. The magnetization of the reproduction layer 11 is extremely small, and moreover the external magnetic field applied is also small; due to these conditions, the magnetostatic energy is taken to be extremely small.

In general, the magnetic wall energy $\sigma_{w1}$ in the reproduction layer 11 is expressed as follows using the exchange stiffness constant $A_1$ and the magnetic anisotropy constant $K_{u1}$.

$$\sigma_{w1} = 4\sqrt{(A_1 K_{u1})}$$

The exchange stiffness constant $A_1$ and magnetic anisotropy constant $K_{u1}$ are both functions of temperature which decline monotonically with increasing temperature, reaching zero at the Curie temperature. Hence domain walls are energetically most stable at the position of highest temperature. For this reason, the domain wall $\sigma_1$ is displaced toward the left in the figure.

Figure 5:
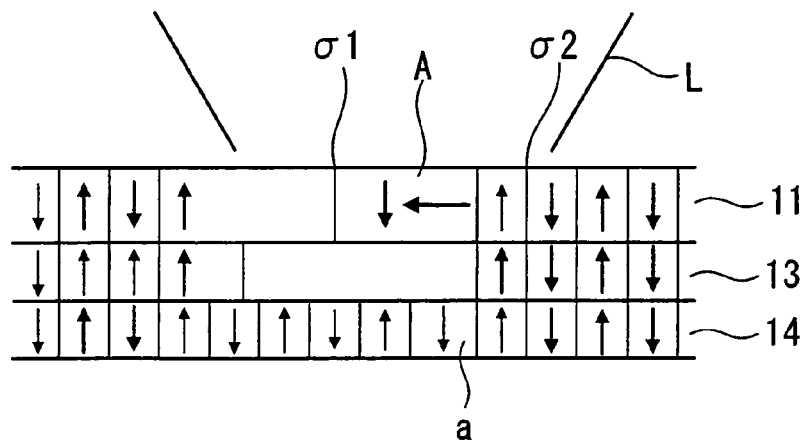
FIG. 5 shows a magnetized state of principal portions in an explanation of the operation of the domain wall displacement detection method.
Figure 6:
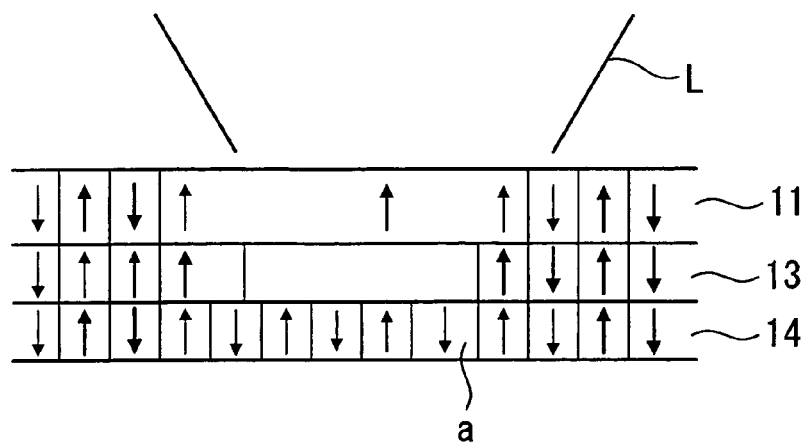
FIG. 6 shows a magnetized state of principal portions in an explanation of the operation of the domain wall displacement detection method.

Further, as shown in FIG. 5, when the exchange coupling between a recorded domain a in the recording layer 14 and the blocking layer 13 is completely interrupted, the domain wall $\sigma_2$ in the reproduction layer 11 is displaced to the position of highest temperature which is energetically the most stable, and as shown in FIG. 6, the domain A disappears.

By means of the series of domain wall displacement operations shown in the above-described FIGS. 2 through 6, that is, by means of the operations in which domain walls in the reproduction layer 11 within the region above the Curie temperature of the blocking layer 13 are displaced to the vicinity of the position of highest temperature, it is possible to reproduce signals from magnetic domains that are so small, or are present in such short periods, that reproduction using an ordinary optical system would not be possible.

However, in the case of the DWDD method employing the three-layer structure described above of a reproduction layer 11, recording layer 14, and blocking layer 13 positioned therebetween, when the period P of recorded domains is large ($P/2 \geq \sigma_D$, the domain wall width), domain wall displacements, referred to as a "ghost" phenomenon, occur. These domain wall displacements occur at positions behind the reproduction light spot, and in contrast with displacements at positions in front of the reproduction light spot, domain walls move from positions behind the spot irradiated with reproduction light L toward the peak portion of the temperature distribution, that is, toward the vicinity of the spot center.

Next, the mechanism of occurrence of ghosting is explained using FIGS. 7 through 15. In this explanation, to facilitate understanding, movement of domain walls during reproduction is explained in the case of an example in which a single extremely small independent recorded domain a exists.

Figure 7:
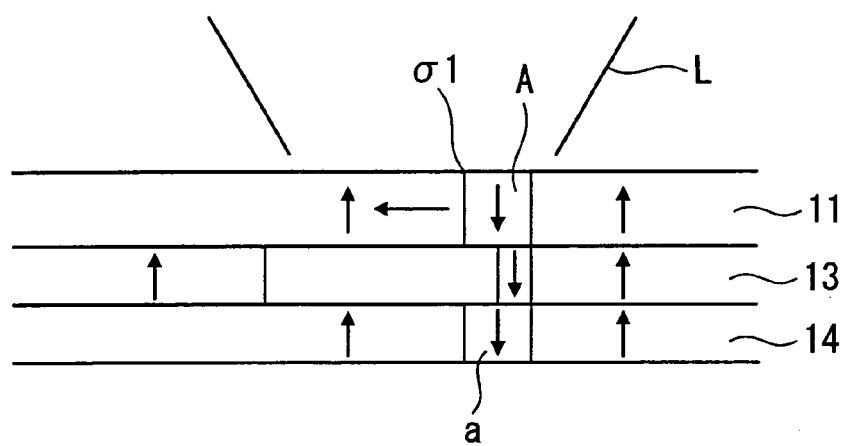
FIG. 7 shows a magnetized state of principal portions to explain the occurrence of ghost signals in a magneto-optical recording medium the recording and reproduction layer of which has a three-layer structure, employed in explaining this invention.
Figure 8:
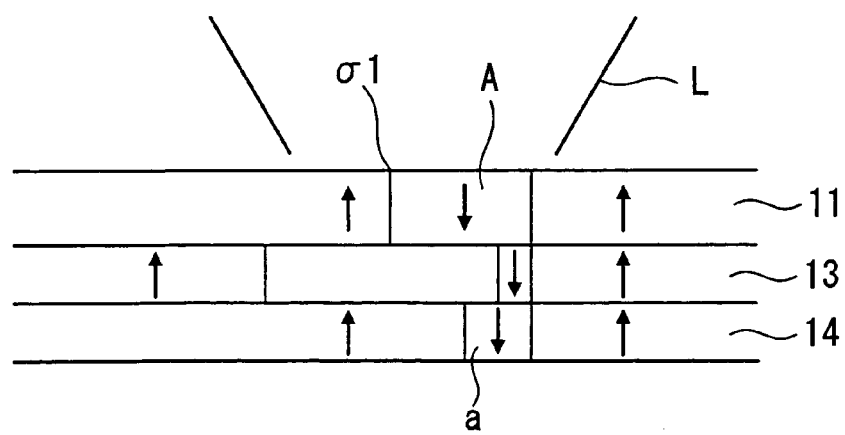
FIG. 8 shows a magnetized state of principal portions to explain the occurrence of ghost signals in a magneto-optical recording medium the recording and reproduction layer of which has a three-layer structure, employed in explaining this invention.
Figure 9:
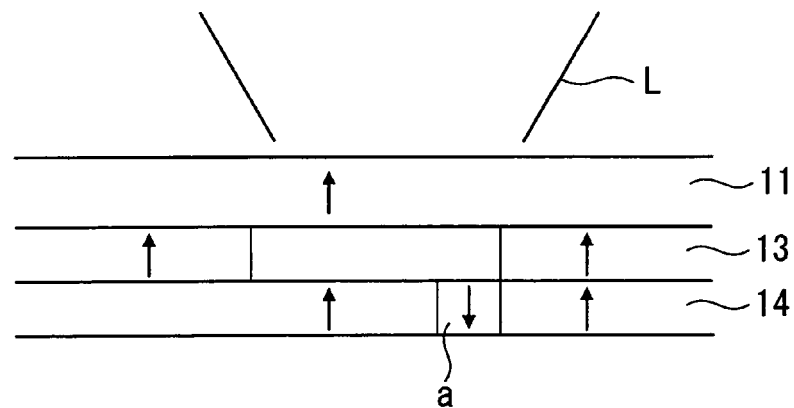
FIG. 9 shows a magnetized state of principal portions to explain the occurrence of ghost signals in a magneto-optical recording medium the recording and reproduction layer of which has a three-layer structure, employed in explaining this invention.

Here, the operation of expansion of recorded domains shown in FIGS. 7 through 9 is similar to that in FIGS. 3 through 6, and so a redundant explanation is omitted.

Figure 10:
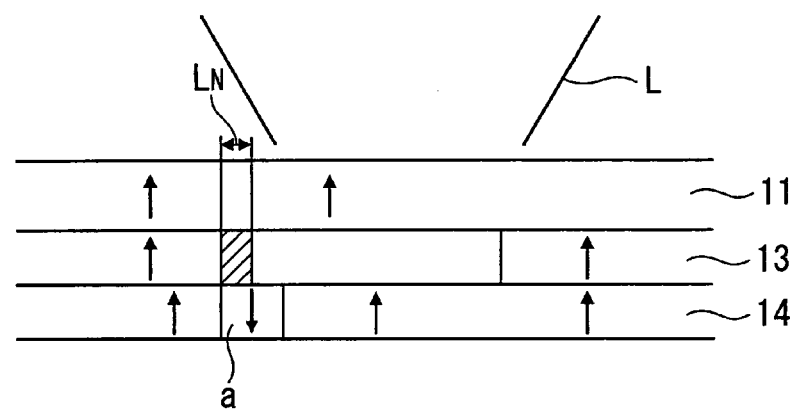
FIG. 10 shows a magnetized state of principal portions to explain the occurrence of ghost signals in a magneto-optical recording medium the recording and reproduction layer of which has a three-layer structure, employed in explaining this invention.

After the end of the expansion and reproduction of the recorded domain a, the magneto-optical recording medium moves relative to the reproduction light, that is, due to rotation of the optical disc the position of irradiation of reproduction light moves; when left edge of the recorded domain a in the recording layer 14 passes through the right-edge position of the blank region of the blocking layer 13, an interface domain wall occurs in the blocking layer 13 due to the difference in directions of the spin in the reproduction layer 11 and the spin in the recording layer 14 (FIG. 10). An interface domain wall is a region of transition between antiparallel spins, and is a high-energy region.

Here, the spin in the recording layer 14 is not immediately transferred to the reproduction layer 11 under the action of exchange coupling because, rather than creating a domain wall within the reproduction layer 11 by generating a new domain in the reproduction layer 11, creation of an interface domain wall in the blocking layer 13 results in lower overall energy.

Figure 11:
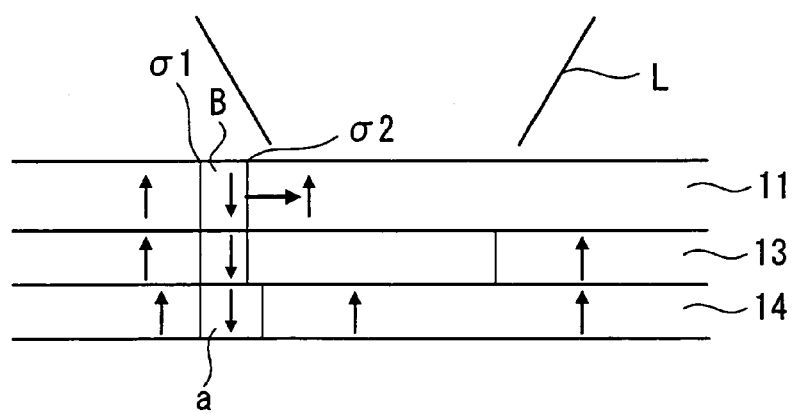
FIG. 11 shows a magnetized state of principal portions to explain the occurrence of ghost signals in a magneto-optical recording medium the recording and reproduction layer of which has a three-layer structure, employed in explaining this invention.

When the position of irradiation of the optical disc by the reproduction light advances and the interface domain wall in the blocking layer 13 reaches a certain length LN, it becomes more stable for a domain wall to be created in the reproduction layer 11 and exchange coupling to occur between the recording layer 14 and the reproduction layer 11. Hence as shown in FIG. 11, spin occurs in the blocking layer 13 in the same direction as the recorded domain a of the recording layer 14, and in addition, due to exchange coupling from the blocking layer 13 to the reproduction layer 11, spin in the same direction also occurs in the reproduction layer 11, and the recorded domain B is formed. As a result, new domain walls $\sigma_1$, $\sigma_2$ are formed in the reproduction layer 11. Here $\sigma_1$ and $\sigma_2$ are actually a single continuous domain wall (the domain wall surrounding the periphery of the domain B), which however appears as two domain walls in the cross-sectional view.

Figure 12:
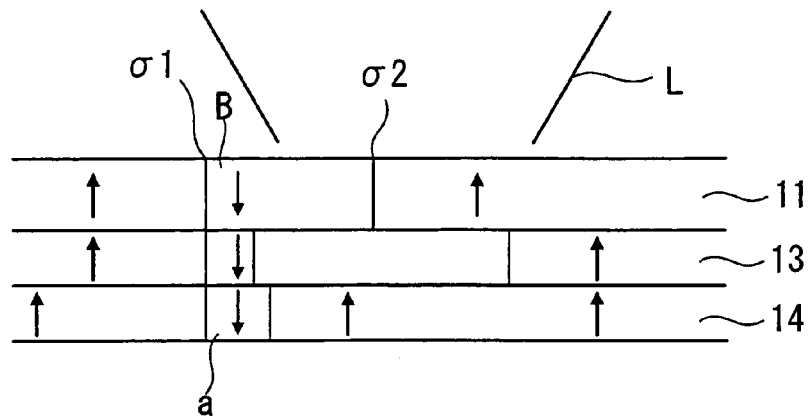
FIG. 12 shows a magnetized state of principal portions to explain the occurrence of ghost signals in a magneto-optical recording medium the recording and reproduction layer of which has a three-layer structure, employed in explaining this invention.
Figure 13:
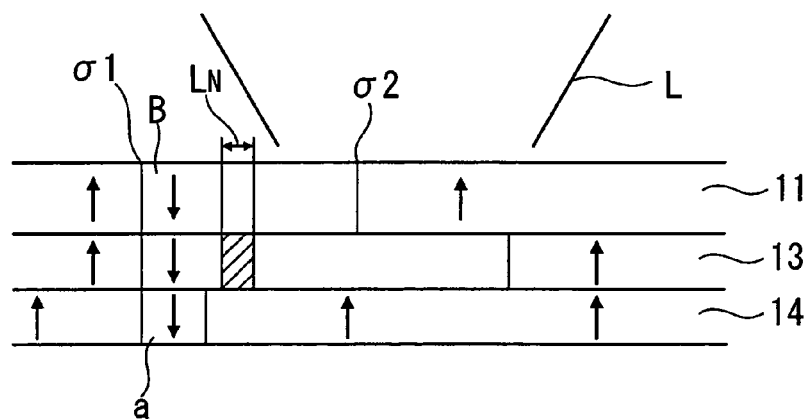
FIG. 13 shows a magnetized state of principal portions to explain the occurrence of ghost signals in a magneto-optical recording medium the recording and reproduction layer of which has a three-layer structure, employed in explaining this invention.

Immediately below the domain wall $\sigma_2$ which has appeared the magnetization in the blocking layer 13 is extremely small and there is almost no exchange coupling acting, so that the domain wall $\sigma_2$ moves to the position in the reproduction layer 11 at which the magnetic energy is minimum. The movement at this time is in the direction of higher temperature, or in the direction which expands the magnetic domain B; as shown in FIG. 12, the magnetic domain $\sigma_2$ moves toward the spot center, and the recorded domain B in the reproduction layer 11 expands.

Figure 14:
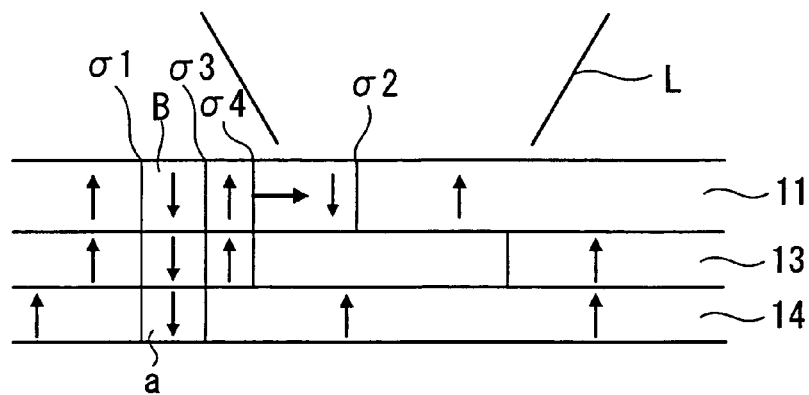
FIG. 14 shows a magnetized state of principal portions to explain the occurrence of ghost signals in a magneto-optical recording medium the recording and reproduction layer of which has a three-layer structure, employed in explaining this invention.
Figure 15:
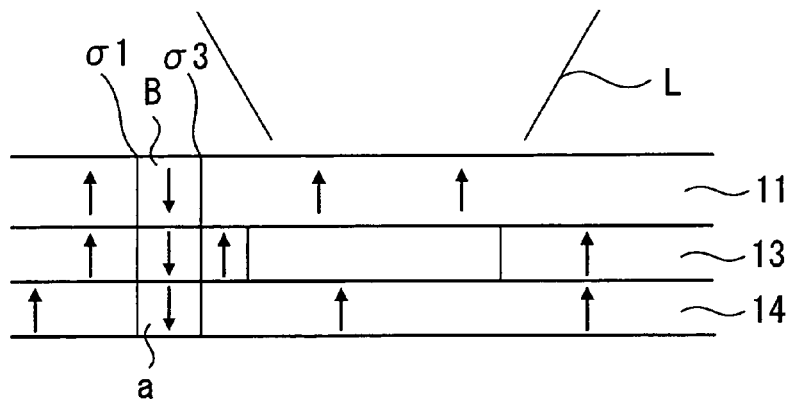
FIG. 15 shows a magnetized state of principal portions to explain the occurrence of ghost signals in a magneto-optical recording medium the recording and reproduction layer of which has a three-layer structure, employed in explaining this invention.

When the disc moves relative to the irradiated light and the recorded domain a in the recording layer 14 passes beyond the blank region in the blocking layer 13, an interface domain wall again appears in the blocking layer 13, and when the length thereof reaches LN (FIG. 13), spin in the same direction as the recording layer 14 appears in the blocking layer 13 and reproduction layer 11, and new domain walls $\sigma_3$, $\sigma_4$ are created in the reproduction layer 11 (FIG. 14).

Immediately below the domain wall $\sigma_4$ the magnetization in the blocking layer 13 is extremely small and there is almost no exchange coupling acting, so that the domain wall $\sigma_4$ moves to the position in the reproduction layer 11 at which the magnetic energy is minimum. As a result, the domain between the domain walls $\sigma_4$ and $\sigma_2$ disappears (FIG. 15), and consequently there is a return to the magnetized state prior to the entry of the recorded domain a into the reproduction light spot L.

Hence upon reproduction of an independent recorded domain, initially the domain wall is displaced to the left in the figure, the recorded domain is expanded and a large signal results; then, the domain in the reproduction layer 11 disappears, the signal level goes to zero, and thereafter a signal once again appears and then disappears due to displacement of the wall toward the right. These changes with time in the signal are shown in FIG. 16.

Figure 16:
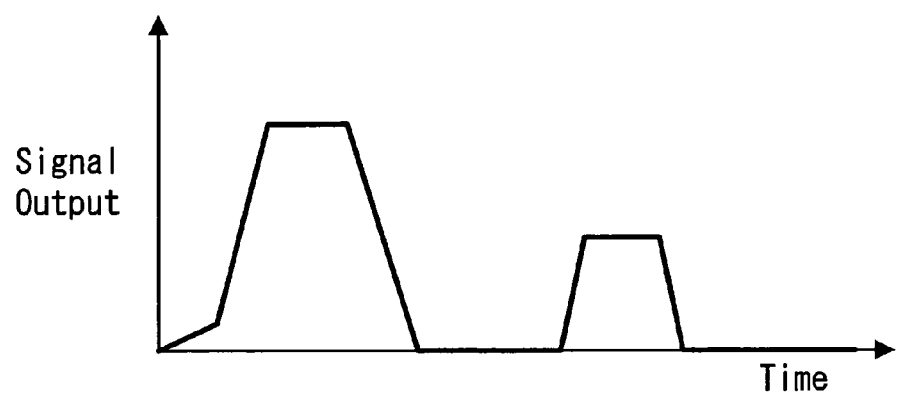
FIG. 16 is a signal output diagram showing the appearance of ghost signals.

However, in actual practice it is extremely difficult to distinguish between whether a second signal in the signal changes shown in FIG. 16 is due to the above-described ghosting phenomenon, or is caused by the next recorded domain, and consequently reproduction errors occur.

This ghosting phenomenon can also occur in cases of a recorded state such as shown in FIG. 2; but in order to cause domain wall displacement behind the spot in the direction of travel which is the origin of ghosting, the length of domains recorded in the recording layer 14 must be equal to or greater than the length LN of the interface domain wall which can be maintained in the blocking layer 13. This length LN is the shortest mark length which causes ghosting. This length LN is determined by the temperature dependence of the domain wall energy $\sigma_{w3}$ in the blocking layer 13, the temperature distribution in the magneto-optical recording medium, and the domain wall energy $\sigma_{w1}$ in the reproduction layer 11. When the period of recorded domains is short, this length is not attained, and so ghosting does not occur.

In a conventional DWDD magneto-optical recording medium not having a magnetic layer with a function to suppress ghosting, this length is taken to be approximately 0.25 μm. Thus in order to suppress the occurrence of ghosting, it is important that the minimum mark length LN for ghosting be made long.

On the other hand, in the above patent publication (International Patent No. WO99/39342), in order to alleviate the above-described ghosting phenomenon, a control layer 12 is inserted between the reproduction layer 11 and the blocking layer 13. The characteristics (Curie temperature, magnetic anisotropy) of this control layer 12 are selected such that $T_{C1} > T_{C2} > T_{C3}$ and moreover, when the magnetic anisotropy of the first magnetic layer is $K_{u1}$ and the magnetic anisotropy of the second magnetic layer is $K_{u2}$, $K_{u2} > K_{u1}$.

Next, the mechanism of alleviation of the ghosting phenomenon by insertion of a control layer having such characteristics, and problems with such a method, are explained.

FIGS. 17 through 22 show the series of domain wall displacement operations in a magneto-optical recording medium having a four-layer structure with this control layer 12 inserted.

Figure 17:
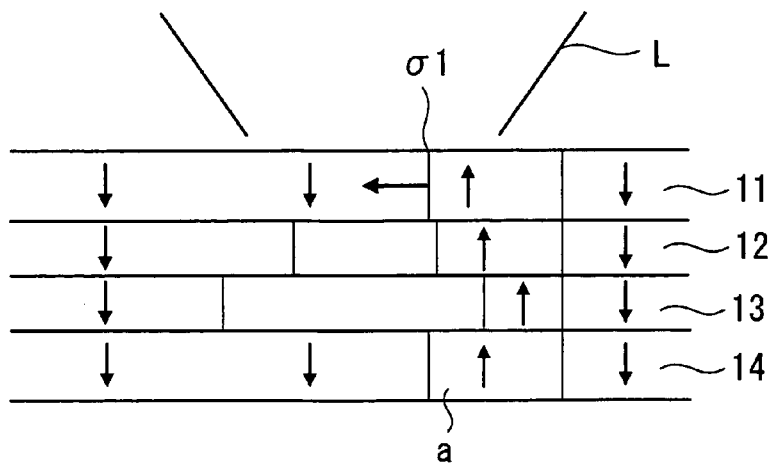
FIG. 17 shows a magnetized state of principal portions to explain the occurrence of ghost signals in a magneto-optical recording medium the recording and reproduction layer of which has a four-layer structure, employed in explaining this invention.
Figure 18:
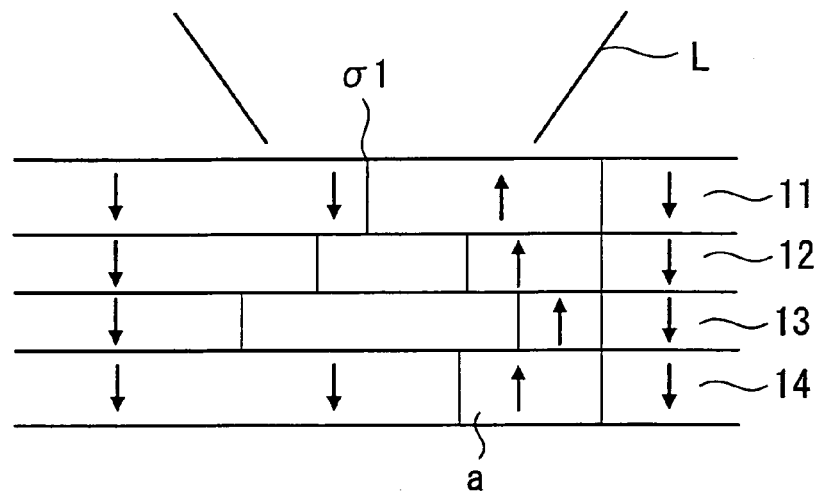
FIG. 18 shows a magnetized state of principal portions to explain the occurrence of ghost signals in a magneto-optical recording medium the recording and reproduction layer of which has a four-layer structure, employed in explaining this invention.

Here, the operation to enlarge recorded domains shown in FIGS. 17 and 18 is similar to that of FIGS. 3 through 6, and so a redundant explanation is omitted.

Whereas in the above-described three-layer-structure magneto-optical recording medium domain walls in the reproduction layer 11 are displaced in the region above the Curie temperature $T_{C3}$ of the blocking layer 13, in this configuration displacement of domain walls in the reproduction layer 11 occurs in the region above the Curie temperature $T_{C2}$ of the control layer 12.

In the region above the Curie temperature $T_{C3}$ of the blocking layer 13, the exchange coupling between the blocking layer 13 and control layer 12 disappears, but because the magnetic anisotropy of the control layer 12 is greater than that of the reproduction layer 11, or stated differently, because the coercivity of the control layer 12 is high and displacement of domain walls is difficult, there is no domain wall displacement in this temperature range.

Figure 19:
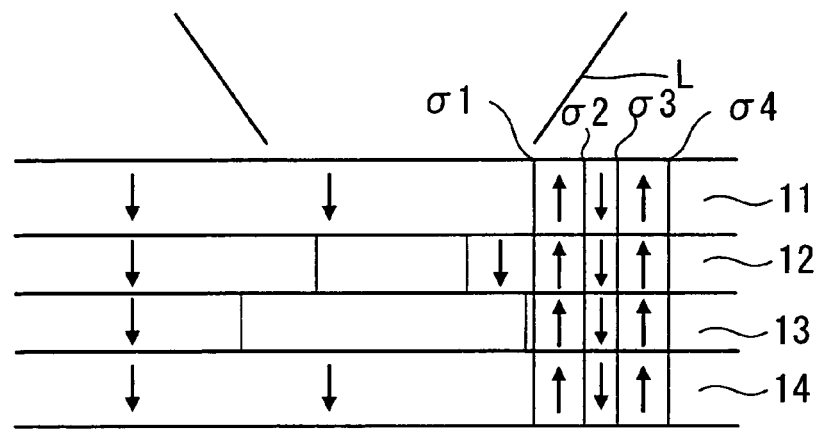
FIG. 19 shows a magnetized state of principal portions, employed in explaining the phenomenon of inability of reproduction for minute domains.

However, when as shown in FIG. 19 domain walls $\sigma_1$ through $\sigma_4$ exist with narrow intervals therebetween (in this case also, domain walls are of course shown in a cross-sectional view as $\sigma_1$ through $\sigma_4$ for convenience, but in actuality these exist connected at domain boundaries), and the linear density of recorded marks, that is, of recorded domains is high and domain lengths are short, a phenomenon occurs in which a domain which is to be expanded within the spot of reproduction light disappears.

This is explained as follows. In FIG. 19, the domain B formed by the domain walls $\sigma_2$ and $\sigma_3$ is formed as a particularly short domain; the explanation focuses on this fact.

Figure 20:
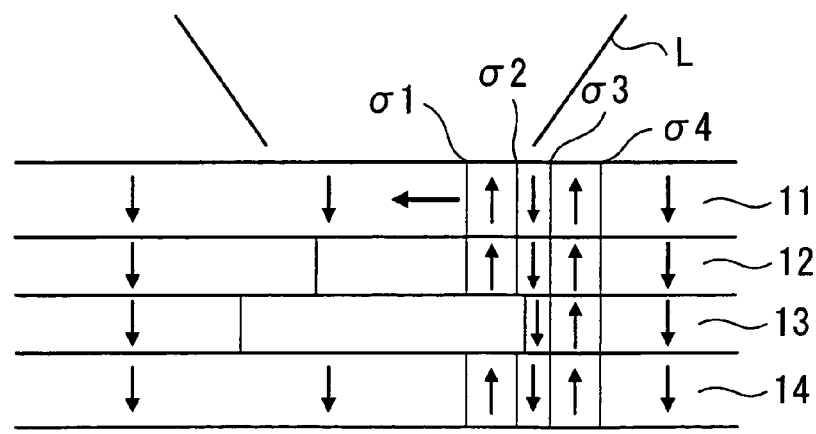
FIG. 20 shows a magnetized state of principal portions, employed in explaining the phenomenon of inability of reproduction for minute domains.
Figure 21:
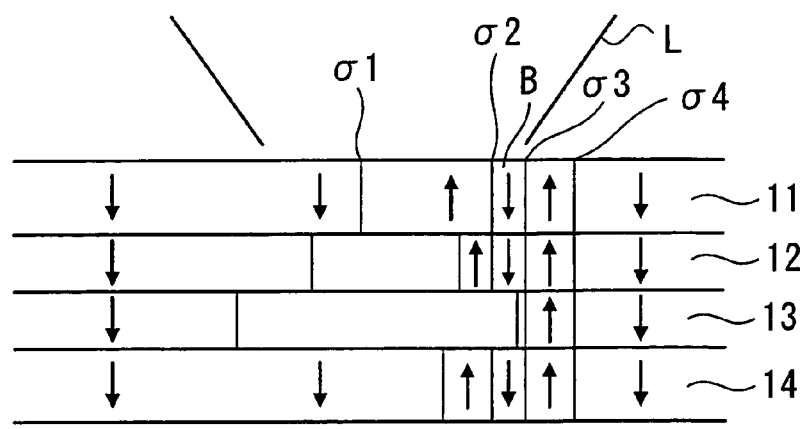
FIG. 21 shows a magnetized state of principal portions, employed in explaining the phenomenon of inability of reproduction for minute domains.
Figure 22:
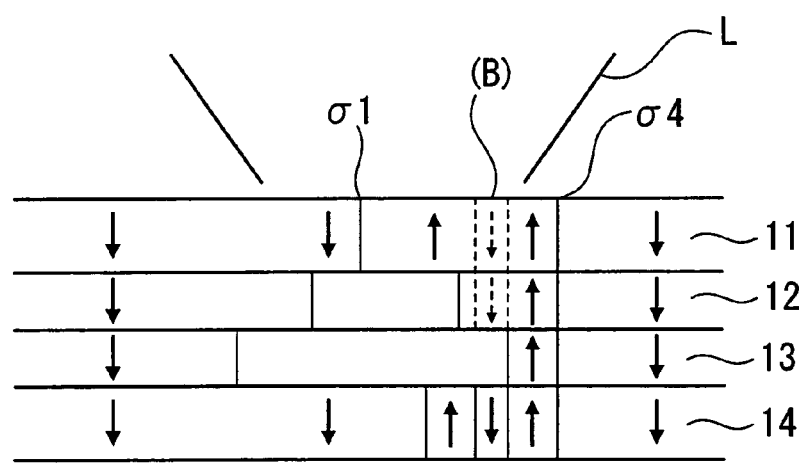
FIG. 22 shows a magnetized state of principal portions, employed in explaining the phenomenon of inability of reproduction for minute domains.

First, when the domain wall $\sigma_1$ on the left edge in the figure forming a comparatively long domain arrives in the region at a temperature close to the Curie temperature $T_{C2}$ of the control layer 12, the magnetization in the control layer 12 declines, and as a result the binding due to this magnetization is diminished; consequently the domain wall $\sigma_1$ is displaced toward the position of the peak in temperature distribution as indicated by the leftward arrow in FIG. 20, that is, toward the vicinity of the center of the spot of reproduction light, and the domain between the walls $\sigma_1$ and $\sigma_2$ expands within the spot as shown in FIG. 22, resulting in a state enabling detection as a large reproduction signal.

However, in the state in which the temperature T is higher than the Curie temperature $T_{C3}$ of the blocking layer 13 and the exchange coupling between the recording layer 14 and the control layer 12 is interrupted, the minimum domain diameter $L_{min}$ of domains which can exist stably and independently in the control layer 12 can be expressed by $$L_{min} = \sigma_{w2}/M_{s2} \cdot H_{c2}$$

where the saturation magnetization, coercivity and domain wall energy of the control layer are respectively $M_{s2}$, $H_{c2}$ and $\sigma_{w2}$.

Near the Curie temperature $T_c$ of the control layer 12, the values of the above $\sigma_{w2}$, $M_{s2}$ and $H_{c2}$ are all small, but because the rate of decrease of the factors in the denominator, $M_{s2}$ and $H_{c2}$, is high, as the temperature T approaches the Curie temperature $T_{C2}$ of the control layer 12, the minimum domain diameter $L_{min}$ of domains which can exist stably increases. Consequently the above-described short domain B becomes smaller than the domain diameter $L_{min}$ possible for stable existence. As shown in FIG. 22, the domain B, which originally would exist in the position indicated by the dashed line, can no longer exist stably, so that the domain B disappears and cannot be detected.

Figure 23:
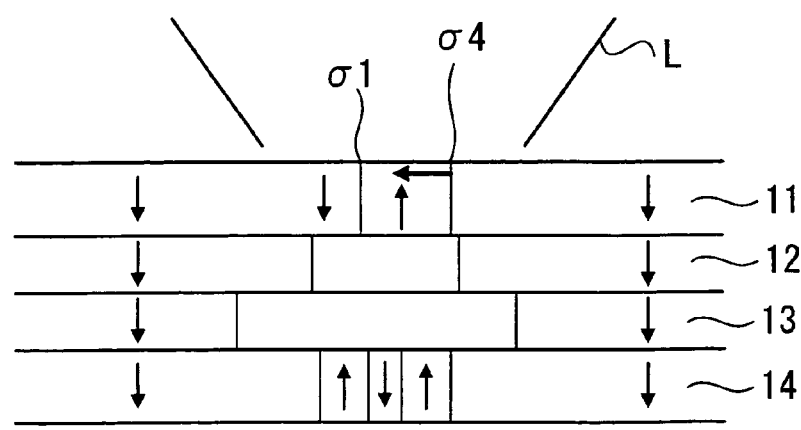
FIG. 23 shows a magnetized state of principal portions, employed in explaining the phenomenon of inability of reproduction for minute domains.

The optical disc then moves further, the domain wall $\sigma_4$ reaches the region close to the Curie temperature $T_{C2}$ of the control layer 12, and the domain wall $\sigma_4$ in the reproduction layer 11 is displaced in the direction of the domain wall $\sigma_1$ as indicated by the arrow in FIG. 23. As a result of this displacement of the domain wall $\sigma_4$ to the position of $\sigma_1$, the domain between $\sigma_1$ and $\sigma_4$ disappears, and as a result a signal waveform like that shown in FIG. 24B is detected.

Figure 24A:
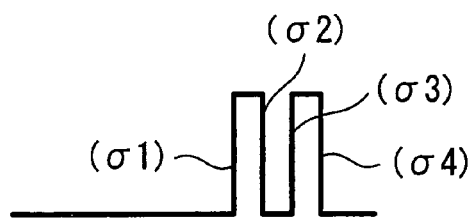
FIG. 24 explains the occurrence of dropout.
Figure 24B:
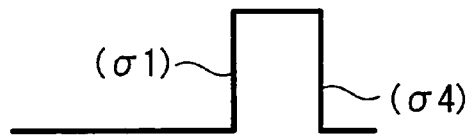

In other words, due to the existence of domain B the waveform of FIG. 24A should normally be detected, but because domain B disappears, that is, because dropout occurs, the signal waveform of FIG. 24B is detected. In other words, a bit error occurs.

In order to prevent such dropout, that is, the inability to reproduce a signal, sophisticated design of the control layer 12 and of each of the layers comprised by the recording layer 13 is necessary; and there is the problem that such design is particularly difficult in combined land and groove recording.

Further, in positions behind the reproduction light spot in the travel direction a magnetization occurs in the control layer 12 at the position of the Curie temperature $T_{C2}$ of the control layer; but because at this temperature there is no action of exchange coupling from the reproduction layer 11, the direction of spin in the control layer 12 is aligned in the direction of the reproduction layer 11. Here the reproduction layer 11 is in a state in which no domain walls exist.

Figure 25:
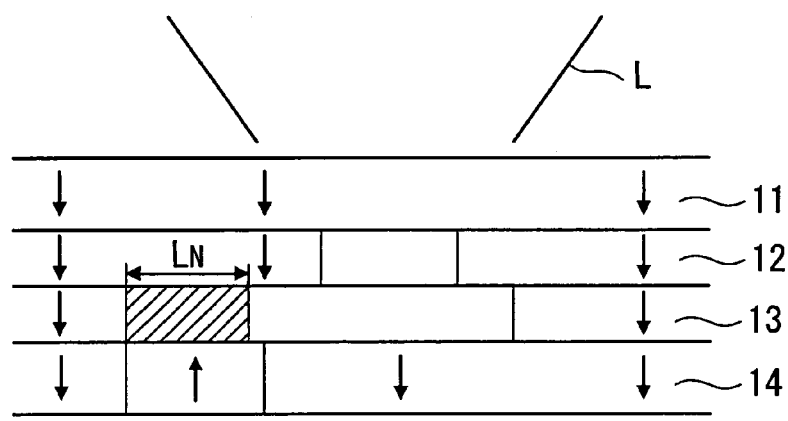
FIG. 25 shows a magnetized state of principal portions, employed in explaining the relation between the occurrence of ghosting and mark lengths.

When the disc moves relative to the reproduction light and the temperature declines to the Curie temperature $Tc_3$ of the blocking layer 13, an interface domain wall appears in the blocking layer 13, as indicated by the shading in FIG. 25.

When due to disc movement the interface domain wall in the blocking layer 13 reaches a certain length LN, it becomes more stable to create a domain wall in the control layer 12 and reproduction layer 11, so that there is exchange coupling between the recording layer 14 and the reproduction layer 11. The energy to create a domain wall in the control layer 12 is far greater than the energy to create a domain wall only in the reproduction layer 11.

Hence the length LN of the interface domain wall in the blocking layer 13 becomes far longer than in the three-layer configuration of the magnetic film. As a result the maximum mark length for which ghosting does not occur is made longer, and so at the recording densities of assumed modulation methods, the effects of ghosting are not felt.

Figure 26:
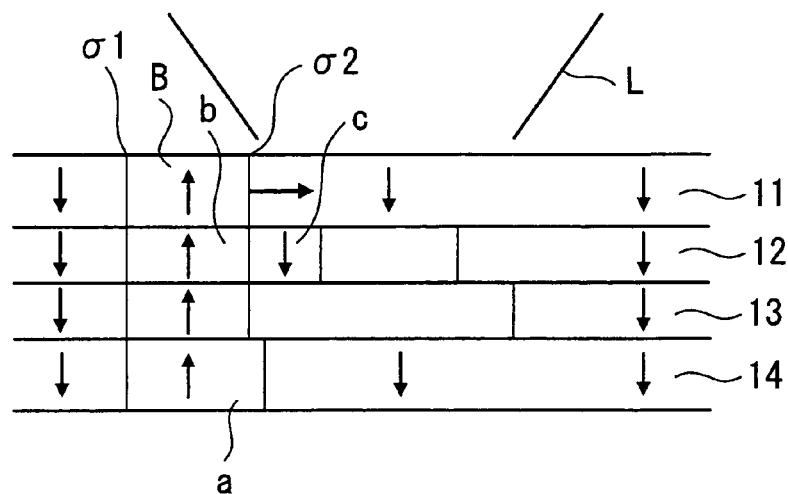
FIG. 26 shows a magnetized state of principal portions, employed in explaining the relation between the occurrence of ghosting and mark lengths.

When the disc rotates and the temperature falls further, as shown in FIG. 26, the exchange coupling force from the recording layer 14 causes the spin in the blocking layer 13 to be aligned in the direction of the spin of the recorded domain a in the recording layer 14, and due to exchange coupling this is transferred to the control layer 12 and reproduction layer 11, so that a recorded domain b and a recorded domain B are formed by transfer in the control layer 12 and in the reproduction layer 11, respectively. Hence a domain wall $\sigma_2$ appears in the reproduction layer 11. The region c remaining in the control layer 12 of exchange coupling with the reproduction layer 11 is at a temperature close to the Curie temperature, so that the domain wall energy and coercivity are small, and magnetization inversion occurs readily. That is, the domain wall $\sigma_2$ appearing in the reproduction layer 11 is displaced to the position of minimum magnetic energy. The displacement at this time is in the direction of higher temperature, or in the direction to enlarge the domain B, so that the domain wall $\sigma_2$ is displaced toward the spot center and the recorded domain B in the reproduction layer 11 is expanded.

Thus in the invention disclosed in the above patent publication, so long as recorded marks are not extremely long, ghosting does not occur, and by optimally designing the control layer 12 in particular it is possible to eliminate the effects of ghosting at an assumed recording density.

However, as described above, there is the concern that dropout occurs easily when mark lengths become short.

On the other hand, in this invention a control layer 12 having characteristics different from that of the invention disclosed in the above patent publication is inserted between the reproduction layer 11 and blocking layer 13 to eliminate the above-described ghosting phenomenon.

In other words, the characteristics (Curie temperature $T_{C2}$ and magnetic anisotropy $K_{u2}$) of the control layer 12 are selected such that, with respect to the Curie temperatures $T_{C1}$ and $T_{C3}$ of the reproduction layer (first magnetic layer) 11 and blocking layer (third magnetic layer) 13, the relation $$T_{C1} > T_{C3} > T_{C2}$$

is satisfied, and with respect to the magnetic anisotropy $K_{u2}$ of the second magnetic layer (control layer) and the magnetic anisotropy $K_{u3}$ of the third magnetic layer (blocking layer), the relation $$K_{u3} > K_{u2}$$

is satisfied.

When performing DWDD reproduction using the above-described magneto-optical recording medium of this invention, ghosting can be eliminated.

Next, the mechanism of eliminating the ghosting phenomenon by insertion of the control layer 12 is explained together with the mechanism of elimination of ghosting in the above patent publication (International Patent No. WO99/39342), in order to elucidate the features of this invention.

Figure 27:
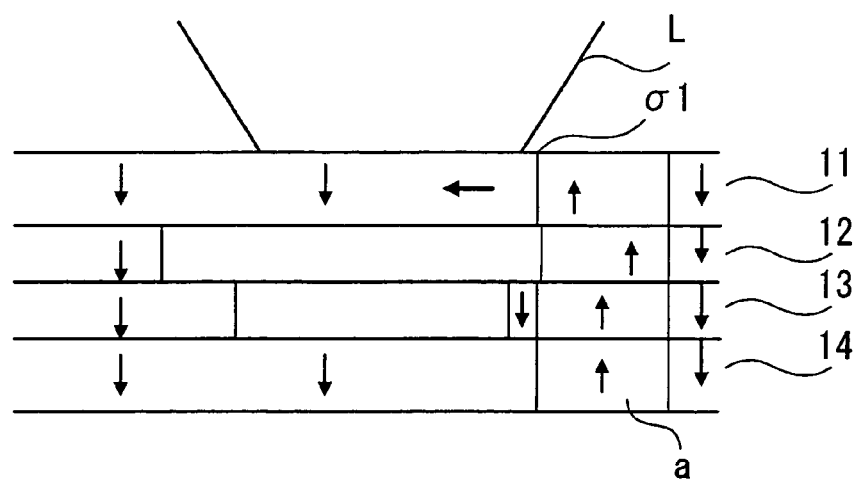
FIG. 27 shows a magnetized state of principal portions in reproduction from a magneto-optical recording medium of this invention, the recording and reproduction layer of which has a four-layer structure.
Figure 28:
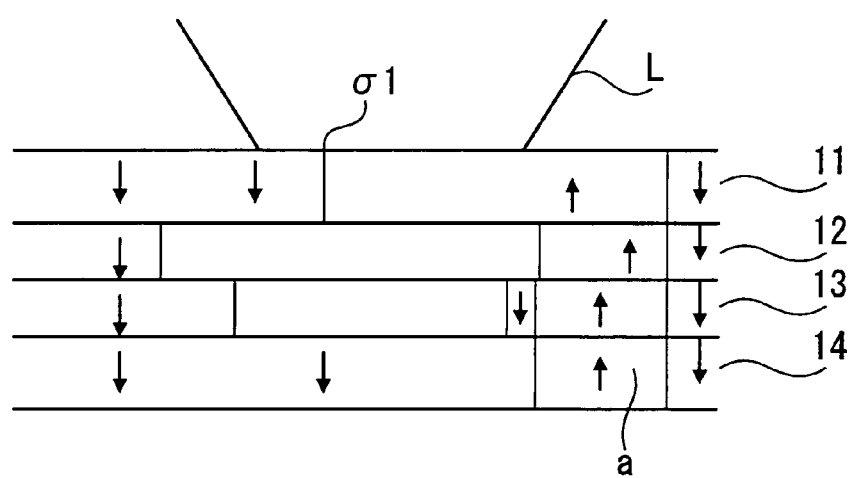
FIG. 28 shows a magnetized state of principal portions in reproduction from a magneto-optical recording medium of this invention, the recording and reproduction layer of which has a four-layer structure.

A series of magnetic domain wall displacement operations in a magneto-optical recording medium having a four-layer structure, with a control layer 12 inserted, is explained referring to FIGS. 27 through 30. FIGS. 27 and 28 show the operation to expand the recorded domain; because these are similar to the above-described FIGS. 3 through 6, a redundant explanation is omitted.

However, as stated above, whereas domain walls in the reproduction layer 11 are displaced in the region at temperatures above the Curie temperature $T_{C3}$ of the blocking layer 13, in the configuration of this invention, displacement of domain walls in the reproduction layer 11 occurs in the region at temperatures above the Curie temperature $T_{C2}$ of the control layer 12.

Because domain walls in the reproduction layer 11 are exchange-coupled with the recording layer 14 immediately before displacement, so long as recording marks are maintained in the recording layer, dropout does not occur even for short marks.

Figure 29:
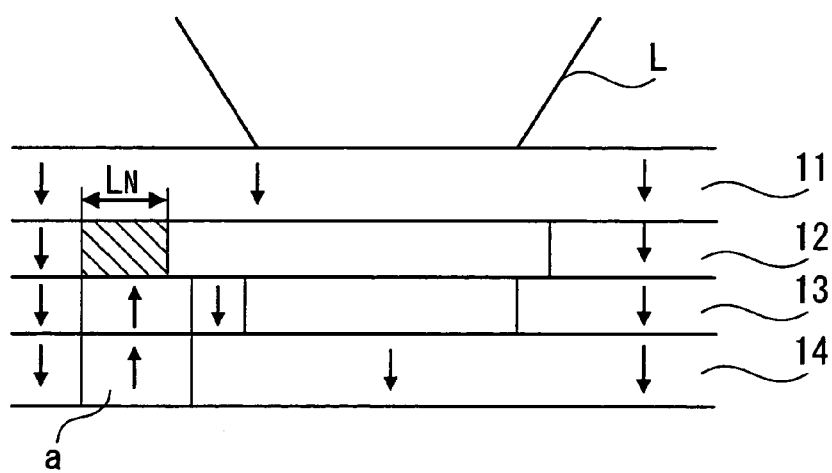
FIG. 29 shows a magnetized state of principal portions in reproduction from a magneto-optical recording medium of this invention, the recording and reproduction layer of which has a four-layer structure.

Next, at positions behind the reproduction light spot in the direction of travel, no magnetization occurs in the blocking layer 13 at positions below the Curie temperature $T_{C3}$ of the blocking layer 13, and because exchange coupling from the recording layer 14 does not act at this temperature, the direction of spin in the blocking layer 13 is aligned with that in the recording layer 14. As indicated in FIG. 29, when the disc advances further and the temperature falls to the Curie temperature $T_{C2}$ of the control layer 12, an interface domain wall appears in the control layer 12, as indicated by shading.

Figure 30:
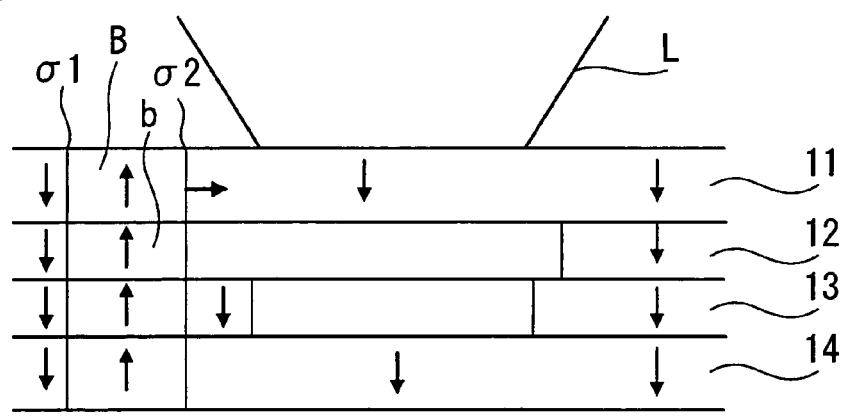
FIG. 30 shows a magnetized state of principal portions in reproduction from a magneto-optical recording medium of this invention, the recording and reproduction layer of which has a four-layer structure.

When the interface domain wall in the control layer 12 reaches a certain length LN due to disc movement, it becomes more stable to create a domain wall in the reproduction layer 11 and produce exchange coupling of the blocking layer 13 and reproduction layer 11, as shown in FIG. 30. Due to the fact that $K_{u3} > K_{u2}$, the magnetic wall energy of the control layer 12 is smaller than that of the blocking layer 13, and for a long length LN, it is more advantageous to create an interface wall in the control layer 12 than to create a domain wall in the reproduction layer 11. This can also be explained as suppression of the transfer of magnetization by means of exchange coupling, since the magnetic anisotropy in the control layer is small.

This invention is further explained below.

Below is an explanation of the advantageous results of the configuration of this invention, which is a configuration in which the Curie temperature and magnetic anisotropy are greater in the blocking layer 13 than in the control layer 12, that is, $T_{C3} > T_{C2}$ and $K_{u3} > K_{u2}$.

First, when there is no blocking layer 13, the control layer 12 plays the conventional role of blocking layer, so that in this case also domain wall displacement detection is possible. However, in this case there is no ghosting suppression effect.

Figure 31:
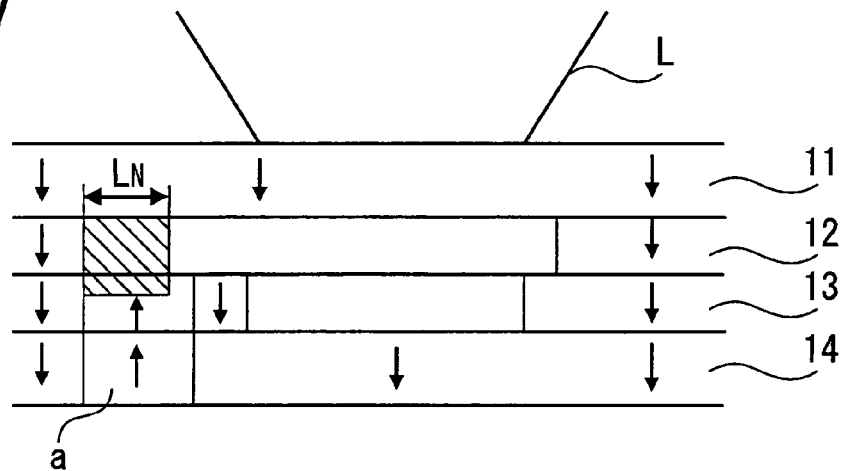
FIG. 31 shows a magnetized state of principal portions in reproduction from a magneto-optical recording medium contrasted with this invention, the recording and reproduction layer of which has a four-layer structure.

On the other hand, when there is a blocking layer 13 an interface domain wall is not confined only to the control layer 12, but as shown in FIG. 31 is partially formed within the blocking layer 13 as well. This is thought to occur because this state is energetically more stable than forming the interface domain wall only in the control layer 12.

When only a control layer 12 is provided and the film thickness is increased by the amount of addition of a blocking layer 13, an interface domain wall length LN is extended and a ghosting suppression effect appears; however as explained above, the effect of blocking of the exchange force becomes uneven due to the increased film thickness, so that scattering (jitter) becomes frequent in the domain wall displacement operations in front of the reproduction laser light spot, leading to degradation of the reproduced signal.

In other words, although it is desirable to lower the Curie temperature of the blocking layer and increase the film thickness in order to obtain the ghosting suppression effect, this along would result in increased jitter and degradation of the reproduction signal; hence the configuration of this invention can be regarded as dividing the blocking layer into a layer of high Curie temperature and a layer of low Curie temperature. That is, by means of the configuration of this invention jitter is suppressed, and it is possible to effectively confine interface domain walls in the film thickness direction within the blocking layer and the control layer.

When the disc moves and the temperature declines further, the spin in the control layer 12 is aligned in the direction of the recorded domain a in the blocking layer 13 due to the exchange coupling force from the blocking layer 13, and due to the exchange coupling this is transferred to the reproduction layer 11, so that the recorded domain B is transferred to and formed in the reproduction layer 11. Hence a domain wall $\sigma_2$ is created in the reproduction layer 11 and is displaced to the position of lowest magnetic energy. The displacement at this time is toward higher temperatures, or in the direction to expand the domain B; the domain wall $\sigma_2$ moves toward the spot center, and the recorded domain B in the reproduction layer 11 is expanded.

Hence in this invention also, if recorded marks become long ghosting occurs, but because the $K_{u2}$ of the control layer 12 is small and interface domain walls are easily created in the control layer, at an assumed recording density it is possible to prevent effects from ghosting.

Next, embodiments of this invention are used in explanations; of course this invention is not limited to these embodiments.

EMBODIMENTS

Figure 32:
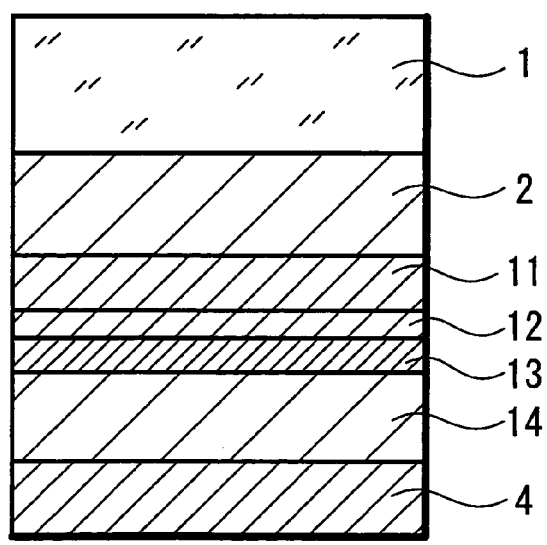
FIG. 32 is a schematic cross-sectional view of an example of a magneto-optical recording medium of this invention.

In this embodiment, a magneto-optical recording medium shown with schematic cross-section in FIG. 32 is formed. Each of the first through fourth magnetic layers 11 to 14 of the recording and reproduction layer, and the dielectric films 2 and 5, were deposited using a magnetron sputtering system.

The target materials used were Gd, Tb, Fe, an Fe:Co=70:30 alloy, Al, and Si. Targets had a diameter of 6 inches, and were placed at equal intervals such that the center of each target was approximately on the perimeter of the same circle.

The distance from the surface of the substrate 1 for deposition of each layer and the surface on which the target was positioned was 150 mm.

The substrate 1 was an optical disc substrate for use in so-called land and groove recording, in which recording is performed in both lands and grooves; this substrate 1 was mounted on a pallet and positioned in a chamber of the magnetron sputtering system, which was evacuated to $1 \times 10^{-4}$ pascals (Pa) or lower.

Then argon and nitrogen gases were supplied to the chamber in a gas flow ratio of 4:1, and the Si was subjected to reactive sputtering to deposit a silicon nitride film of thickness approximately 35 nm on the substrate, thus forming the dielectric film 2.

Next argon gas was supplied, and the first through fourth magnetic layers 11 to 14 were deposited in order on this dielectric film 2, to form the recording and reproduction layer 3. The total thickness of the recording and reproduction layer 3 comprising the first through fourth magnetic layers 11 to 14 was approximately 110 nm.

The first magnetic layer 11 was a GdFeCoAl layer; the second magnetic layer was a TbFeCoAl layer; the third magnetic layer was a TbFeCo layer; and the fourth magnetic layer was a TbFeCo layer.

Then, silicon nitride film was further deposited to a thickness of approximately 35 nm, to form the dielectric film 4. The material compositions and thicknesses of the various layers were set so as to function as a so-called domain wall displacement detection medium.

The depth of grooves in the substrate 1 was 175 nm. The groove pitch was 1.08 μm, and because land and groove recording was performed, the track pitch during recording was set to 0.54 μm. The substrate 1 was formed by injection molding of polycarbonate (PC).

The stamper used in this injection molding was a metal stamper fabricated by using reactive ion etching (RIE) to form grooves in a glass master, and then using electroless plating of metal and electroplating on the glass master.

The optical system employed in recording and reproduction comprised a semiconductor laser of wavelength 660 nm, and an objective lens with a numerical aperture (NA) of 0.60.

During recording, random signals encoded using (1,7) RLL encoding were recorded by pulse strobe magnetic field modulation at a pulse duty of approximately 30%.

During reproduction, the bit error rate was used as an evaluation index. The channel clock frequency was 18 MHz. The bit length was adjusted through the linear velocity, and the linear recording density dependence of the medium was evaluated.

Figure 33:
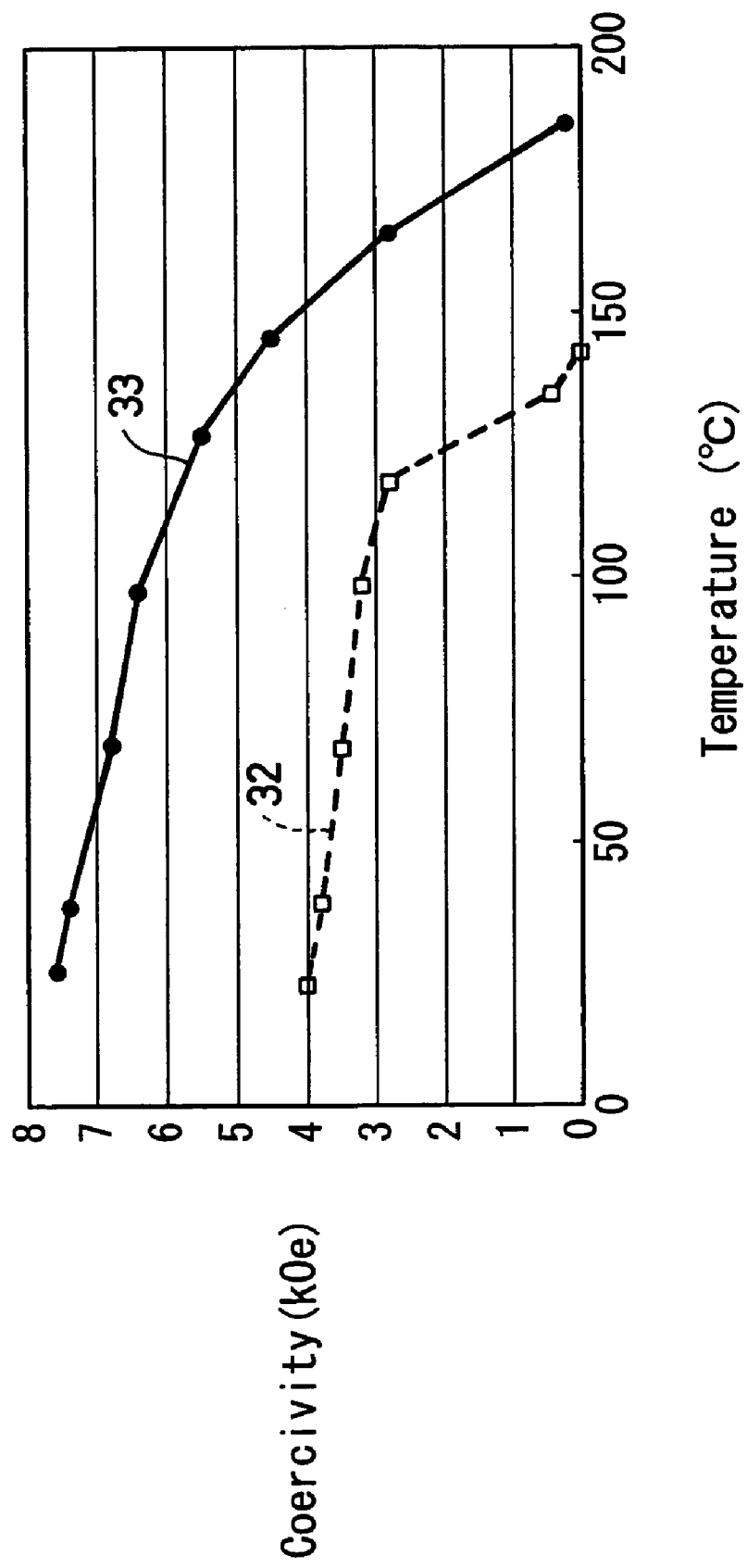
FIG. 33 shows temperature characteristic curves of coercivity of the second and third magnetic layers in a magneto-optical recording medium of this invention.

FIG. 33 shows the results of measurements of the temperature characteristics of coercivity for the second magnetic layer (control layer) 12 and third magnetic layer (blocking layer) 13; the curves 32 and 33 are the temperature characteristics of the second and third films. The Curie temperatures $T_{C1}$ and $T_{C4}$ of the first and fourth magnetic layers 11 and 14 were approximately 300° C. and 330° C. respectively.

In this embodiment, magnetic layers having the temperature characteristics shown in FIG. 33 were used; but modifications can be made freely, so long as the combination of magnetic layers satisfies the following relations, where $T_{C1}$ is the Curie temperature of the first magnetic layer 11, $T_{C2}$ is the Curie temperature of the second magnetic layer 12, $T_{C3}$ is the Curie temperature of the third magnetic layer 13, and $T_{C4}$ is the Curie temperature of the fourth magnetic layer 14:

$$T_{C1} > T_{C3} > T_{C2} \text{ and}$$

$$T_{C4} > T_{C3}$$

and also satisfies the following relation, where $K_{u2}$ is the magnetic anisotropy of the second magnetic layer 12 and $K_{u3}$ is the magnetic anisotropy of the third magnetic layer 13:

$$K_{u3} > K_{u2}.$$

In the domain wall displacement detection medium of this embodiment, upon measuring the minimum mark length to generate ghosting, results of 0.32 μm for lands and 0.46 μm for grooves were obtained. For comparison, in a medium in which the blocking layer 13 of this embodiment is omitted, the minimum mark length to generate ghosting was measured to be 0.25 μm for lands and 0.35 μm for grooves.

Figure 34:
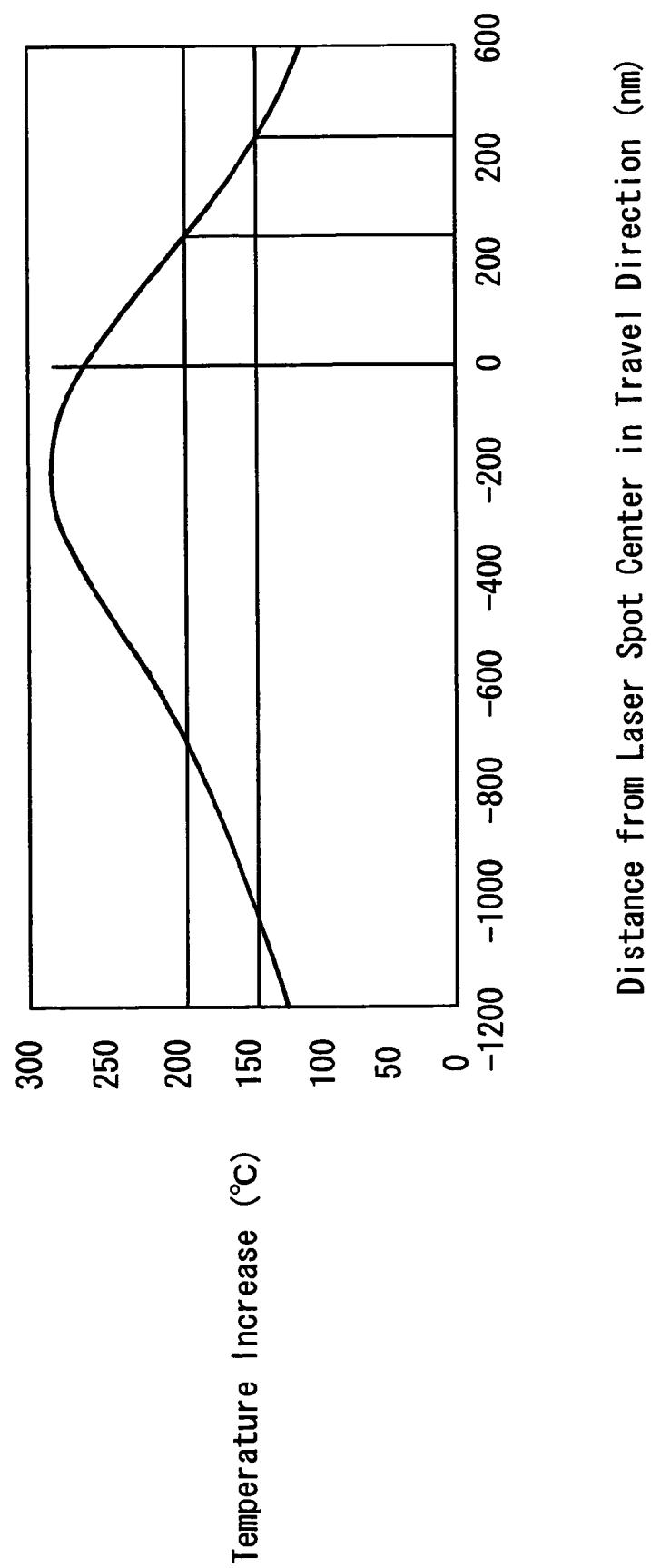
FIG. 34 shows the temperature distribution in the laser spot travel direction in an example of a magneto-optical recording medium of this invention; and, FIG. 35 shows the linear recording density dependences in lands and grooves in an example of a magneto-optical recording medium of this invention.

The magneto-optical recording medium (optical disc) in the above-described embodiment was irradiated with laser light at a wavelength of 660 nm and an NA of 0.60 at a laser power of 1.5 mW; FIG. 34 shows the temperature distribution in the laser spot travel direction when the optical disc was rotated at a linear velocity of 1.5 m/s.

When the difference in Curie temperatures of the second magnetic layer (control layer) and third magnetic layer (blocking layer) was approximately 50° C., the distance between Curie temperature positions in the blocking layer and control layer in front of the laser spot in the direction of travel was approximately 0.2 to 0.3 μm.

In the case of the medium configuration disclosed in the above patent publication, when the shortest mark period is reduced to 0.2 to 0.3 μm, there is the possibility of dropout for the reasons described above, and so in this case either the Curie temperature difference must be reduced to less than 50° C., or the magnetic anisotropy $K_{u2}$ of the control layer must be increased, or some other adjustment made. However, in actuality such increases in magnetic anisotropy tend to be connected to increases in the Curie temperature, so that such adjustments are difficult.

On the other hand, by means of the configuration of this invention such adjustments are unnecessary, and design of a medium is made easy.

Figure 35:
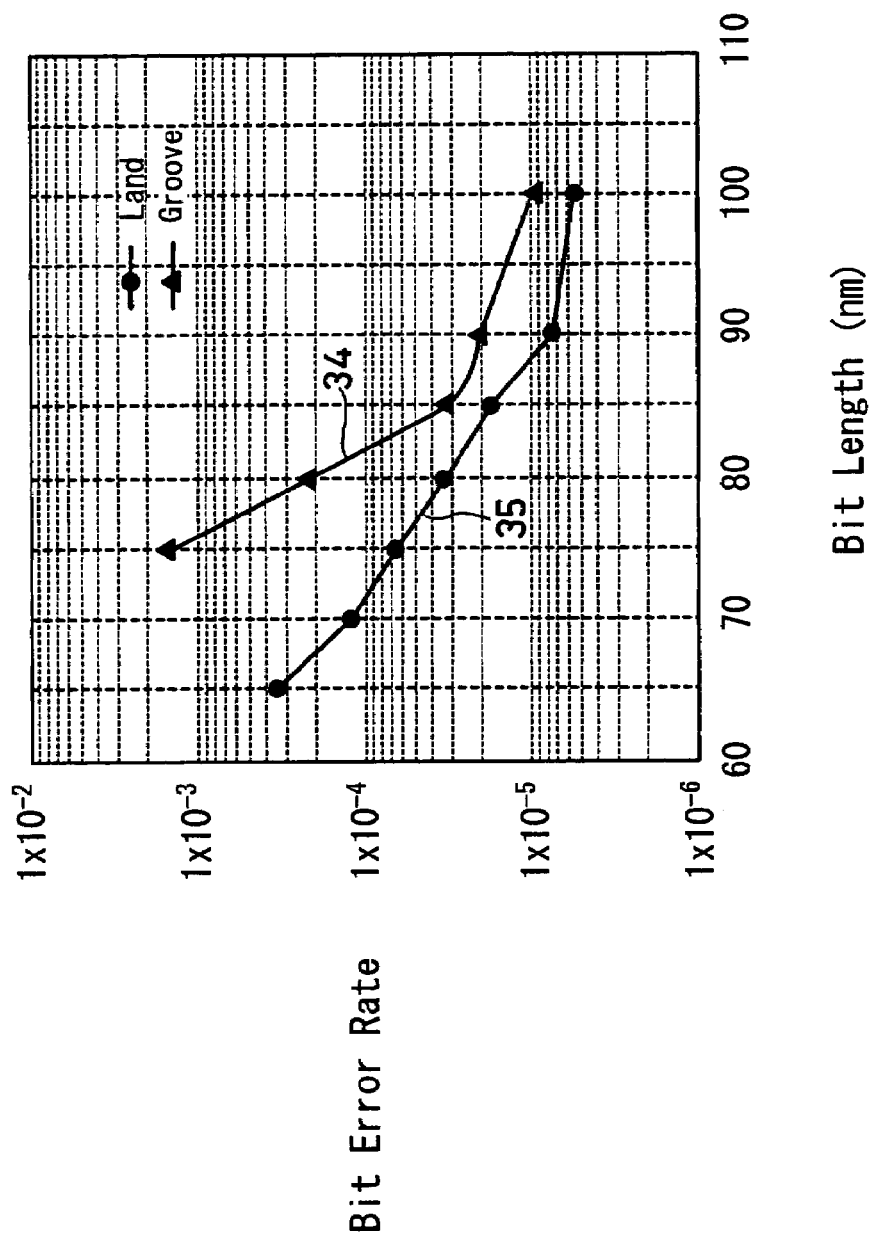

FIG. 35 shows, as the curves 34 and 35, data on the linear recording density dependence in lands and grooves, for the evaluation conditions of the above-described embodiment of this invention.

By using the medium of this invention, it was possible to obtain sufficiently low bit error rates in both lands and grooves, even at extremely high linear recording densities of approximately 90 nm/bit.

As explained above, by means of a magneto-optical recording medium of this invention and a reproduction method using the same employing domain wall displacement detection, it is possible to eliminate the ghosting which occurs in the case of a conventional three-layer-structure recording and reproduction layer. In the case of the four-layer structure, by specifying the film configuration and characteristics, that is, when the Curie temperatures of the first magnetic layer (reproduction layer, domain wall displacement layer), second magnetic layer (control layer), third magnetic layer (blocking layer), and fourth magnetic layer (recording layer) are respectively $T_{C1}$, $T_{C2}$, $T_{C3}$, $T_{C4}$, by setting $T_{C1} > T_{C3} > T_{C2}$ and $T_{C4} > T_{C3}$, and moreover, when the magnetic anisotropies of the second magnetic layer and third magnetic layer are $K_{u2}$ and $K_{u3}$ respectively, by setting $K_{u3} > K_{u2}$, the occurrence of dropout and ghost signals can be effectively avoided even at high linear recording densities, that is, when recorded domains are minute. Further, design of a magneto-optical recording medium can be made easy.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A magneto-optical recording medium, in which signal reproduction through irradiation with reproduction light is performed by domain wall displacement detection, comprising:

at least, in order from the side of incidence of the laser light for reproduction, a first magnetic layer constituting a reproduction layer, a second magnetic layer constituting a control layer, a third magnetic layer constituting a blocking layer, and a fourth magnetic layer constituting a recording layer, and wherein:

when the Curie temperatures of said first magnetic layer, second magnetic layer, third magnetic layer, and fourth magnetic layer are respectively $T_{C1}$, $T_{C2}$, $T_{C3}$ and $T_{C4}$, the relations $$T_{C1} > T_{C3} > T_{C2} \text{ and}$$

$$T_{C4} > T_{C3}$$

are satisfied;

when the magnetic anisotropy constants of the second magnetic layer and of the third magnetic layer are respectively $K_{u2}$ and $K_{u3}$, the relation $$K_{u3} > K_{u2}$$

is satisfied;

magnetic domain walls in said first magnetic layer in front of the irradiation spot of said reproduction light on said magneto-optical recording medium in the direction of travel are displaced toward the temperature peak portion occurring in proximity to the center of the reproduction light spot as a result of irradiation by said reproduction light, so that a recorded magnetic domain is expanded, and displacement in the spot direction of magnetic domain walls in said first magnetic layer behind the reproduction light spot in the direction of travel is suppressed; and, said second magnetic layer and said third magnetic layer control the magnetic exchange coupling between said first magnetic layer and said fourth magnetic layer.

2. A signal reproduction method, which performs detection of reproduction signals in a magneto-optical recording medium through irradiation of reproduction light by domain wall displacement detection, wherein:

said magneto-optical recording medium has at least, in order from the side of incidence of the laser light for reproduction, a first magnetic layer constituting a reproduction layer, a second magnetic layer constituting a control layer, a third magnetic layer constituting a blocking layer, and a fourth magnetic layer constituting a recording layer;

when the Curie temperatures of said first magnetic layer, second magnetic layer, third magnetic layer, and fourth magnetic layer are respectively $T_{C1}$, $T_{C2}$, $T_{C3}$ and $T_{C4}$, the relations $$T_{C1} > T_{C3} > T_{C2} \text{ and}$$

$$T_{C4} > T_{C3}$$

are satisfied;

when the magnetic anisotropy constants of the second magnetic layer and of the third magnetic layer are respectively $K_{u2}$ and $K_{u3}$, the relation $$K_{u3} > K_{u2}$$

is satisfied;

magnetic domain walls in said first magnetic layer in front of the irradiation spot of said reproduction light on said magneto-optical recording medium in the direction of travel are displaced toward the temperature peak portion occurring in proximity to the center of the reproduction light spot as a result of irradiation by said reproduction light, so that a recorded magnetic domain is expanded, and displacement in the spot direction of magnetic domain walls in said first magnetic layer behind the reproduction light spot in the direction of travel is suppressed; and, said second magnetic layer and said third magnetic layer control the magnetic exchange coupling between said first magnetic layer and said fourth magnetic layer.

* * * * *